(12) United States Patent
Velasco (10) Patent No.: US 11,494,074 B1
(45) Date of Patent: Nov. 8, 2022

(54) SYSTEMS FOR ACCESSING ADDITIONAL INFORMATION FROM AN INTERFACE

(71) Applicant: AMAZON TECHNOLOGIES, INC., Seattle, WA (US)

(72) Inventor: Alvaro Mattos Velasco, Madrid (ES)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/066,924

(22) Filed: Oct. 9, 2020

(51) Int. Cl.
*G06F 3/04886* (2022.01)
*G06F 3/04845* (2022.01)
*G06Q 30/06* (2012.01)

(52) U.S. Cl.
CPC ...... *G06F 3/04886* (2013.01); *G06F 3/04845* (2013.01); *G06Q 30/0629* (2013.01); *G06F 2203/04803* (2013.01)

(58) Field of Classification Search
CPC ............. G06F 3/04886; G06F 3/04845; G06F 2203/04803; G06Q 30/0629
See application file for complete search history.

(56) References Cited

U.S. PATENT DOCUMENTS

| | | | | |
|---|---|---|---|---|
| 5,970,471 | A * | 10/1999 | Hill | G06Q 30/02 |
| | | | | 705/26.8 |
| 9,959,010 | B1 * | 5/2018 | Yu | G06F 3/0483 |
| 10,055,184 | B1 * | 8/2018 | Ferrell | G06F 3/0482 |
| 2013/0155099 | A1 * | 6/2013 | Ha | H04M 1/72403 |
| | | | | 348/14.02 |
| 2013/0166471 | A1 * | 6/2013 | Fukuda Kelley | G06F 16/958 |
| | | | | 705/344 |
| 2014/0249957 | A1 * | 9/2014 | Saha | G06Q 30/0613 |
| | | | | 705/26.41 |
| 2014/0279249 | A1 * | 9/2014 | Westphal | G06Q 30/0603 |
| | | | | 705/26.62 |
| 2015/0040018 | A1 * | 2/2015 | Wu | G06Q 30/0631 |
| | | | | 715/738 |
| 2017/0060509 | A1 * | 3/2017 | Tulasi | G06F 40/284 |
| 2017/0118308 | A1 * | 4/2017 | Vigeant | H04N 7/15 |
| 2017/0153905 | A1 * | 6/2017 | Chopra | G06F 3/0482 |
| 2017/0269791 | A1 * | 9/2017 | Meyerzon | G06F 3/0481 |
| 2019/0147521 | A1 * | 5/2019 | Agarwal | G06Q 30/0625 |
| | | | | 705/26.8 |
| 2019/0392176 | A1 * | 12/2019 | Taron | G06F 3/167 |
| 2020/0117658 | A1 * | 4/2020 | Venkata | G06F 16/24534 |
| 2020/0226378 | A1 * | 7/2020 | Rachidi | G06K 9/6201 |
| 2021/0097594 | A1 * | 4/2021 | Periyathambi | G06Q 30/0629 |
| 2021/0173529 | A1 * | 6/2021 | Mostaert | H04W 4/029 |

* cited by examiner

*Primary Examiner* — Ryan F Pitaro
(74) *Attorney, Agent, or Firm* — Lindauer Law, PLLC (57) ABSTRACT

A first interface, such as a set of search results, is presented that includes first data in a first region and second data in a second region. Presented data may include images, text, or other information associated with items available for purchase. User input indicating a portion of the first data is received. In response to the user input, third data that is related to the indicated portion of the first data is determined. The third data is presented in the first region of the interface in place of the first data. Further input to the first region may return the first data to view. As a result, a user may view the third data within the first interface without navigating to a separate interface. Selection of a navigational link associated with the third data may navigate to a portion of a subsequent interface where the third data is presented.

20 Claims, 8 Drawing Sheets

SYSTEMS FOR ACCESSING ADDITIONAL INFORMATION FROM AN INTERFACE

BACKGROUND

The amount of information presented to users in various types of interfaces may by limited by the size of the interface or the size of a display area presenting the interface. In such a case, to view additional information, users may be required to navigate to separate interfaces, which may consume time and computational resources and create a negative user experience.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Various types of interfaces may present information to users in formats intended to facilitate viewing and understanding of the information. However, the amount of information that is presented at a particular time may be constrained by the size of the interface or by the size of a display area of a device. For example, a user attempting to purchase a type of item from an online store may provide a search input, such as one or more keywords describing the type of item. A device associated with the online store may receive the search input and provide interface data to a device associated with the user. The interface data may cause the device associated with the user to present an interface in which information regarding items that correspond to the search input is shown. For example, an image and descriptive text associated with a first item, such as an item name, a price, information regarding user reviews for the first item, and so forth may be presented in a first region of the interface, while an image and descriptive text associated with a second item may be presented in a second region. Depending on the size of the display area accommodating the interface and the size of the interface itself, other regions of the interface that present information regarding other items may also be visible. Additionally, other regions of the interface may be viewed by scrolling, navigating to subsequent pages or screens, and so forth. To access additional information regarding a particular item, such as additional descriptive text, user reviews, available variations of the item, other items available from the same brand or manufacturer, and so forth, the user must usually select the item from the interface to navigate to a subsequent interface that presents the additional information. When a user seeks to view additional information regarding multiple items, the user must typically navigate to a separate interface for each item, view the information for one item, then return to the initial interface to select another item and view the information associated with a subsequent item. This process may be time consuming, may consume computational resources associated with generation of an interface for each selected item and processing requests to navigate to these interfaces, and may result in a negative user experience. For example, a user attempting to compare detailed information for multiple items may be unable to view the information for a first item alongside similar information for a second item, especially when using a mobile device or other device having a limited display area.

Described in this disclosure are techniques for enabling a user to access additional information regarding one or more items presented in a first interface without navigating away from the first interface. For example, while additional information regarding a first item is viewed, information regarding other items presented in the first interface may remain visible and accessible to input by a user. While implementations described herein discuss receiving a search input from a user and providing a first interface that includes information regarding items available for purchase, the techniques described in this disclosure may be used with any type of interface independent of the types of information presented.

When a search input is received from a user device, data that is responsive to the search input may be determined. For example, first item data associated with a first item that corresponds to the search input and second item data associated with a second item that corresponds to the search input may be determined. The first item data may include a first image of the first item, first text indicative of the first item, and so forth. The first text may include an item name, a price, a brand or manufacturer, an indication of a review score or rating for the item, and so forth. Similarly, the second item data may include a second image of the second item and second text indicative of the second item. The second text may include the same types of information as the first text, or different types of information. First interface data may be provided to the user device to cause the user device to present a first interface. The first interface may present at least a portion of the first item data in a first region, and at least a portion of the second item data in a second region. For example, the first interface may include a search result output in which the first image is presented within a bounded region adjacent to the first text, while the second image is presented within a different bounded region adjacent to the second text. The first interface may also include information regarding one or more additional items that correspond to the search input. For example, based on the size of the first interface or the size of a display area in which the first interface is presented, information regarding a subset of the items that correspond to the search input may be presented, while information regarding other items that correspond to the search input may be accessed by scrolling, navigating to other pages or screens of the first interface, or providing input to other types of navigational controls.

To access additional information without navigating away from the first interface, the first interface may be configured to receive user input to specific portions of the item data that is presented. Additional information to be presented may be determined based on one or more of the type of user input that is received or the location within the first interface to which the user input was provided. For example, a user attempting to view additional information regarding user reviews for a first item may provide user input, such as a swipe gesture or other type of input, to a portion of the text in the first interface that indicates a review score for the first item. In response to the user input, additional text associated with the first item, such as the text of one or more reviews associated with the first item, may be determined. Interface data indicative of this text may be provided to the user device to cause the user device to present at least a portion of this text in the region of the interface where data regarding the first item is presented. For example, the additional text may be presented in the same region of a display where an image and text associated with the first item was presented, while presentation of at least a portion of the original image and text is ceased. As a result, a user may view this review information without navigating away from the first interface. For example, while the additional text associated with the first item is visible, subsequent input may be provided to a region of the interface associated with the second item to access additional information associated with the second item without navigating away from the first interface. Continuing the example, user input may be used to cause additional information for any number of items to be presented at a particular time, which may enable the user to compare review information or other types of information for multiple items. Other types of input provided to the first interface may be used to access other types of information. For example, input provided to a brand name or image may cause data indicative of other items associated with a brand, or data indicative of other available variations of an item, to be presented in the region of the interface where data regarding the first item is presented. In some implementations, subsequent user input provided to a control in the interface may be used to cease viewing the additional text and return to viewing the original information regarding the first item.

In some implementations, the interface may include one or more navigational links to a subsequent interface for purchasing or viewing detailed information regarding an item. For example, the first interface may present an image of an item, an item name, a price, and so forth. A first type of user input associated with the first item, such as a tap gesture provided to an image of the first item, may be used to navigate to a subsequent interface that presents additional information about the item, while a second type of user input, such as a swipe gesture provided to a portion of text indicative of the first item, may be used to cause additional information to appear in the first interface, such as review information. When review information, or another type of additional information, is presented, user input provided to the region of the interface presenting the additional information may be used to navigate to a portion of the subsequent interface that is related to the additional information. For example, user input that is provided to a region of the interface associated with the first item while review information is presented may navigate to a portion of a subsequent interface associated with user reviews, while user input provided to the same region of the interface while other information is presented may navigate to a portion of the subsequent interface associated with the other information.

As one skilled in the art will appreciate in light of this disclosure, certain embodiments may be capable of achieving certain advantages, including some or all of the following: Enabling a user to access information from a first interface that would normally be accessible by navigating to a separate interface may reduce the time and computational resources used to provide a user with the information. Additionally, by enabling such information to be accessed from the first interface, a user may more efficiently access other information associated with other portions of the first interface while retaining the context associated with the additional information. As a result, a user may more efficiently obtain various types of additional information and compare additional information for multiple items while using less time and computational resources when compared to the time and navigational resources associated with navigation to separate interfaces. Additionally, when a user navigates to a separate interface, the particular portion of the separate interface that is initially presented may be controlled based on the information that is selected by the user, which may more efficiently direct users toward information of interest.

Figure 1:
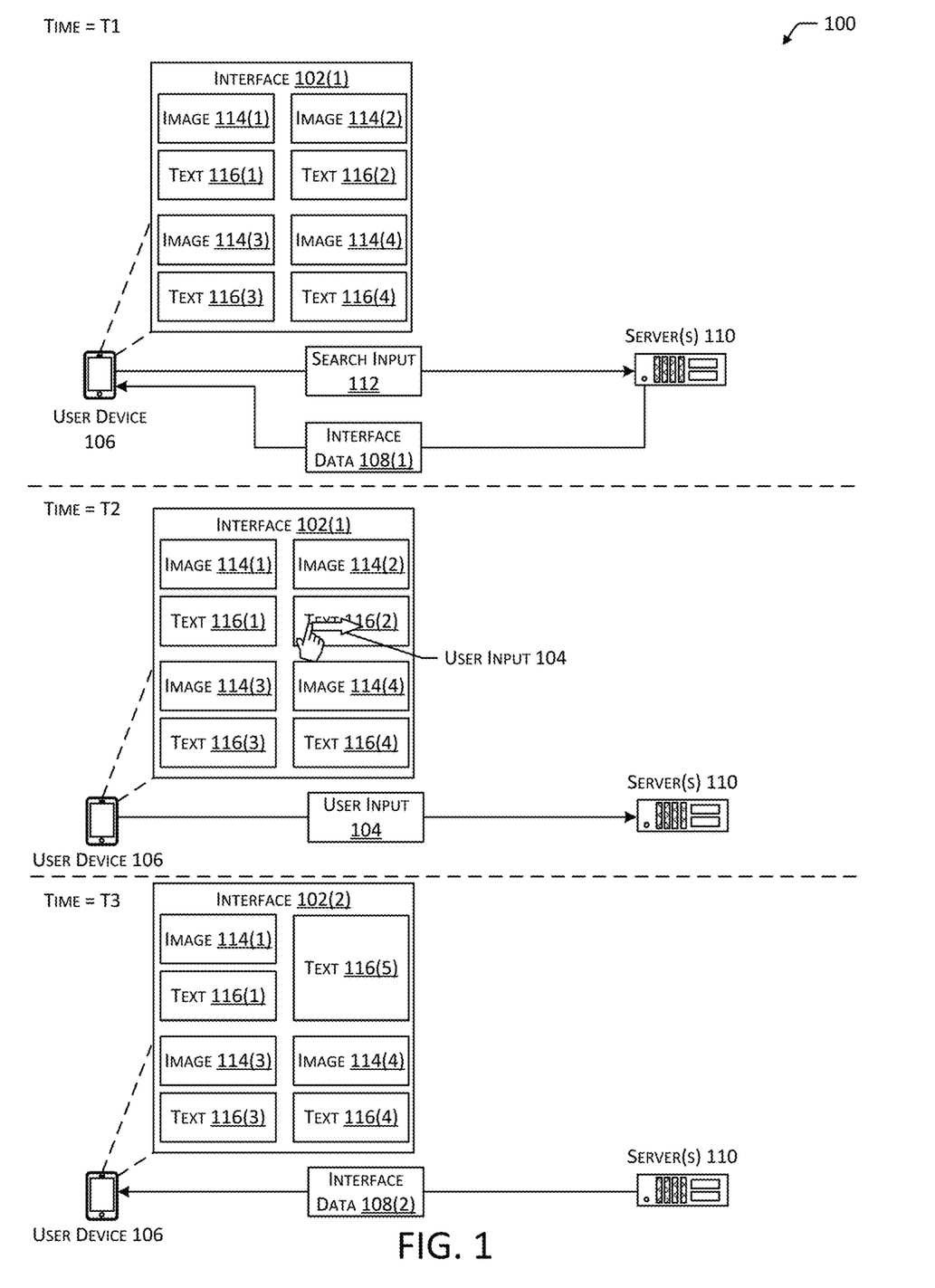
FIG. 1 is a diagram depicting an implementation of a system for controlling the information presented in an interface based on user input to particular regions of the interface.

FIG. 1 is a diagram 100 depicting an implementation of a system for controlling the information presented in an interface 102 based on user input 104 to particular regions of the interface 102. At a first time T1, a user device 106 may present a first interface 102(1) based on interface data 108(1) received from one or more servers 110. For example, the server(s) 110 may be associated with an online store or other type of system through which one or more items or services may be purchased or rented. A user associated with the user device 106 may provide a search input 112, which may be sent to the server(s) 110. The server(s) 110 may determine interface data 108(1) indicative of one or more items that correspond to the search input 112. For example, the search input 112 may include one or more keywords, an indication of one or more item categories, or other types of alphanumeric data. In other implementations, the search input 112 may include one or more of audio data, image data, or video data in addition to or in place of alphanumeric data. The server(s) 110 may access item data indicative of one or more characteristics of items, such as item names, types, categories, brands, manufacturers, sizes, colors, dimensions, or other characteristics of the items. Based on correspondence between the item data and the search input 112, the server(s)

110 may determine particular items that are potentially relevant to the search input 112 and may send interface data 108(1) to the user device 106 to cause the user device 106 to present an interface 102(1) including information indicative of the determined items.

For example, FIG. 1 depicts the user device 106 presenting a first interface 102(1) in which a first image 114(1) and first text 116(1) associated with a first item are presented in a first region of the interface 102(1). Similarly, a second image 114(2) and second text 116(2) associated with a second item are presented in a second region, a third image 114(3) and third text 116(3) associated with a third item are presented in a third region, and a fourth mage 114(4) and fourth text 116(4) associated with a fourth item are presented in a fourth region. For example, an image 114 may include a picture of an item available for purchase, while the text 116 may include one or more of an item name, price, brand, manufacturer, review information, and so forth. While FIG. 1 depicts the first interface 102(1) presenting four images 114 and four sets of text 116, any number of images 114 or sets of text 116 may be presented depending on the size of the display area of the user device 106, or the size of the interface 102(1), which in some cases may be controlled based on user input 104. Additionally, in some implementations, additional images 114 or text 116 may be accessed, such as by scrolling the interface 102(1) or providing user input 104 to other navigational controls, such as to view additional screens or pages of information.

While FIG. 1 depicts the user device 106 as a smartphone, any number and any type of computing device may be used including, without limitation, personal computing devices, portable computing devices, mobile computing devices, wearable computing devices, set top boxes, game controllers, and so forth. Additionally, while FIG. 1 depicts a server 110 providing the interface data 108(1) to the user device 106, any number of servers 110 or any other type of computing device(s) including, without limitation, the types of computing devices described with regard to the user device 106, may be used.

At a second time T2 after the first time T1, a user associated with the user device 106 may provide user input 104 to a region of the first interface 102(1). For example, FIG. 1 depicts the user input 104 including a swipe gesture provided to a touch sensor of the user device 106 at a location of the first interface 102(1) that corresponds to the second set of text 116(2). Continuing the example, a user attempting to view additional information associated with user reviews for a particular item may provide user input 104 to a portion of the text 116(2) indicative of user reviews. As another example, a user attempting to view additional information associated with other items available from a particular brand or manufacturer may provide user input 104 to a portion of the text 116(2) indicative of a brand or manufacturer. As yet another example, a user attempting to view additional information associated with available variations of the item may provide user input 104 to the second image 114(2) or to a portion of the second text 116(2) indicative of a particular variation of the item. The user device 106 may provide data indicative of the user input 104 to the server(s) 110. While FIG. 1 illustrates the user input 104 as a horizontal swipe gesture that moves from a left side of the second text 116(2) toward a right side thereof, in other implementations, other types of user input 104, such as a tap gesture, a long-press, a double-tap gesture, swipe gestures that move in other directions, and so forth may be used. For example, in response to a horizontal swipe gesture that moves from a right side of the second text 116(2) toward a left side thereof, a first function may be performed, while in response to a vertical swipe gesture that moves from an upper side of the second text 116(2) toward a lower side thereof, a second function may be performed. Additionally, user input 104 may include selections or gestures using a mouse device, keyboard, or other type of input device in addition to or in place of touch gestures provided to a touch sensor.

At a third time T3 after the second time T2, the server(s) 110 may determine second interface data 108(2) in response to the user input 104. For example, based on the particular text 116(2) or other content presented in the region of the first interface 102(1) to which the user input 104 was provided, the server(s) 110 may determine other text 116(5), images 114, or other content that is associated with the particular content indicated by the user input 104. Continuing the example, if the user input 104 is provided to a portion of the second text 116(2) associated with user reviews, the second interface data 108(2) may include fifth text 116(5) associated with one or more user reviews for the item indicated in the second text 116(2). In other implementations, the type of user input 104 that is provided may be used to determine the second interface data 108(2). For example, a first type of additional content may be determined in response to a swipe gesture that moves from left to right, a second type of content in response to a swipe gesture that moves from right to left, a third type of content in response to a vertical swipe gesture, a fourth type of content in response to a long-press input, a fifth type of content in response to a double-tap input, and so forth.

The user device 106 may present a second interface 102(2) based on the second interface data 108(2). The second interface 102(2) may present the first image 114(1) and first text 116(1) in the first region, the third image 114(3) and third text 116(3) in the third region, and the fourth image 114(4) and fourth text 116(4) in the fourth region. However, in place of the second image 114(2) and second text 116(2) presented in the second region of the first interface 102(1), the second interface 102(2) may present the fifth text 116(5) in the second region of the second interface 102(2). As a result, a user associated with the user device 106 may view the fifth text 116(5) without navigating away from the other content presented in the first interface 102(1). For example, in the second interface 102(2), the first image 114(1), first text 116(1), third image 114(3), third text 116(3), fourth image 114(4), and fourth text 116(4) may remain visible and accessible. Continuing the example, additional user input 104 may be provided to regions of the second interface 102(2) that include other content, such as the first text 116(1), and additional interface data 108 may be determined that replaces the region of the second interface 102(2) where the user input 104 was provided with additional text 116 or images 114. In some implementations, additional user input 104 may be provided to a region of the second interface 102(2) that includes the fifth text 116(5), and the fifth text 116(5) may be replaced by the second image 114(2) and second text 116(2) that was originally presented in the first interface 102(1). Additionally, in some implementations, user input 104 provided to one or more of the images 114 or text 116 presented in the first interface 102(1) or second interface 102(2) may cause navigation to a separate interface 102, such as an interface 102 for purchasing an item associated with the region to which the user input 104 was provided.

Figure 2:
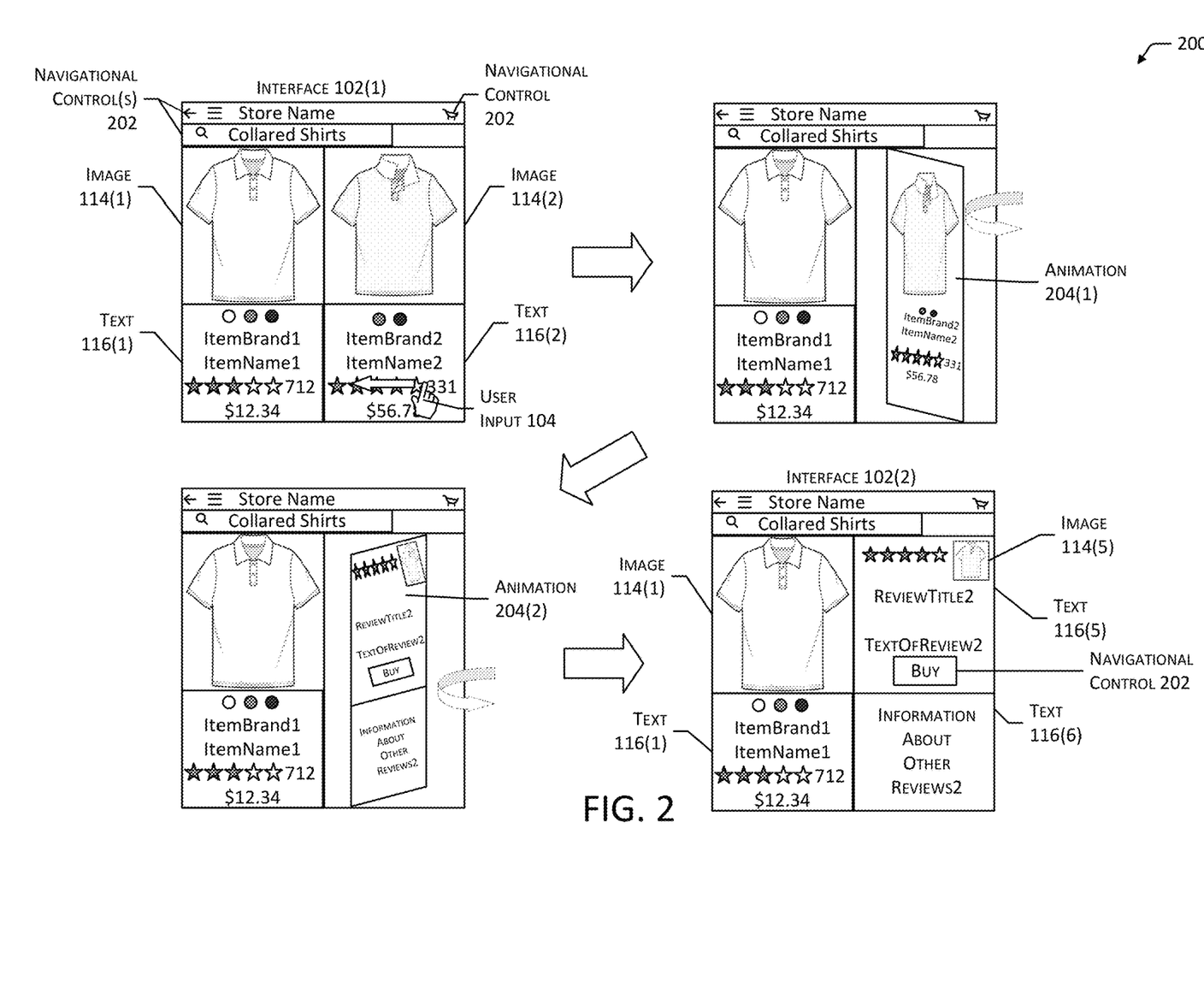
FIG. 2 is a diagram depicting an implementation of a transition from a first interface to a second interface based on user input to a particular region of the first interface.

FIG. 2 is a diagram 200 depicting an implementation of a transition from a first interface 102(1) to a second interface 102(2) based on user input 104 to a particular region of the first interface 102(1). As described with regard to FIG. 1, the first interface 102(1) may include a first region in which information associated with a first item is presented. For example, FIG. 2 depicts a first image 114(1) representing a first item and first text 116(1) indicative of the first item. Continuing the example, the first text 116(1) may include an item name, an item brand or manufacturer, an indication of user reviews for the first item (such as a user review score), a price of the first item, and so forth. Similarly, the first interface 102(1) may include a second region that presents information associated with a second item, such as a second image 114(2) and second text 116(2). While FIG. 2 depicts the first interface 102(1) presenting two images 114 and two sets of text 116 within two different regions, in other implementations, an interface 102(1) may include more than two regions and may present additional information in the other regions. For example, the size of the first interface 102(1) and the number of regions within which information regarding items or other content may be presented may be determined based on the size of a display area of a user device 106. In other cases, the sizes of the first interface 102(1) may be determined based in part on user input 104. For example, the size of an interface 102(1) presented within a window associated with a browser application may be determined based in part on the size of the window, which may be controlled via user input 104. In some implementations, in response to user input 104 provided to change the size of an interface 102(1), the amount of information that is presented may be changed. For example, in response to user input 104 to enlarge a window associated with a browser application, a larger quantity of text 116 may be presented. In response to user input 104 to decrease the size of such a window, a smaller quantity of text 116 may be presented. For example, the full text of a user review may be presented in an enlarged window, while a truncated portion of the text may be presented in a smaller window.

The first interface 102(1) may also include one or more navigational controls 202. For example, navigational controls 202 may include one or more buttons associated with navigation using a browser or other type of application, such as a "back" button. As another example, navigational controls 202 may include a search field into which a user may input alphanumeric data to cause navigation to other interfaces 102 based on input to the search field. As yet another example, navigational controls 202 may include one or more buttons or links to navigate to other interfaces 102, such as an interface 102 associated with a user account, an electronic shopping cart, and so forth. Navigational controls 202 may also include scroll bars that may be used to view other images 114 or text 116 associated with different items, buttons for navigating to additional pages or screens of the first interface 102(1), and so forth.

As described with regard to FIG. 1, in response to user input 104 associated with a particular portion of the first interface 102(1), additional information may be determined for presentation. For example, FIG. 2 depicts user input 104 that includes a swipe gesture provided to a portion of the second text 116(2) associated with review information for the second item. In other implementations, other types of user input 104 may be used, such as tap gestures, long-press gestures, double-tap gestures, swipe gestures that move in other directions, input from mouse devices or other type of input devices, and so forth. In response to the user input 104, interface data 108(2) associated with additional text 116, or other information associated with the portion of the second text 116(2) to which the user input 104 was provided, may be determined. To indicate the effect of the user input 104, the user device 106 may present an animation 204(1), such as a perceived rotation or other type of movement associated with the content in the second region of the first interface 102(1). For example, the content within the second region of the first interface 102(1) may be provided with the appearance of a card having the second image 114(2) and second text 116(2) on a first side thereof. As the animation 204(1) causes the card to appear to rotate, additional information on a second side of the card may rotate into view, as shown in FIG. 2 as a second animation 204(2). The animations 204 may facilitate visibility of additional information presented in the second interface 102(2) by providing a visual indication of regions of the second interface 102(2) where additional content has been presented.

In response to user input 104 associated with a portion of the second text 116(2) associated with user reviews, the second interface 102(2) may include fifth text 116(5) and sixth text 116(6) in the second region that are associated with user reviews. For example, the fifth text 116(5) may include the text of a particular user review, such as a preferred, curated, or highly-rated user review, while the sixth text 116(6) may include information regarding the content of other reviews, such as topics or comments present in one or more user reviews. Other types of text 116 or images 114 may be presented in response to user input 104 to other portions of the first interface 102(1). For example, information regarding other items that are associated with a particular brand may be presented in response to user input 104 to a portion of the text 116(2) indicative of the brand of an item.

In some implementations, the additional information presented in the second interface 102(2) may include an indication of at least a portion of the information presented in the corresponding region of the first interface 102(1). For example, FIG. 2 depicts the second interface 102(2) including a fifth image 114(5), which may be identical to the second image 114(2), but may have one or more dimensions smaller than a corresponding dimension of the second image 114(2). In other implementations, the second region of the second interface 102(2) may include one or more different images 114 that represent the second item, a portion of the second text 116(2) such as the name of the item, or other text 116 that is indicative of the second item. Presentation of the fifth image 114(5), or other information indicative of the item, may maintain the context associated with the item presented in the first interface 102(1) when the additional information presented in the second interface 102(2) is viewed. For example, the fifth image 114(5) may indicate an association between the second item and the information presented in the fifth text 116(5) when viewed by a user.

In some implementations, the second interface 102(2) may include a navigational control 202, such as a button or link, that may be used to navigate to a separate interface 102 to obtain additional information about an item associated with the second region of the second interface 102(2), or to initiate a purchase transaction associated with the item. For example, additional user input 104 provided to one or more of the fifth image 114(5), fifth text 116(5), sixth text 116(6), or a navigational control 202 may cause navigation to a subsequent interface 102 associated with the second item. In some implementations, providing a particular type of user input 104 or providing user input 104 to a particular portion of the second region of the second interface 102(2) may cause presentation of the fifth text 116(5), sixth text 116(6), and fifth image 114(5) to cease and the second image 114(2) and second text 116(2) to be presented in the second region, as shown in the first interface 102(1). In some cases, animations 204 similar to those shown in FIG. 2 may be presented when presentation of the second image 114(2) and second text 116(2) is resumed.

Figure 3:
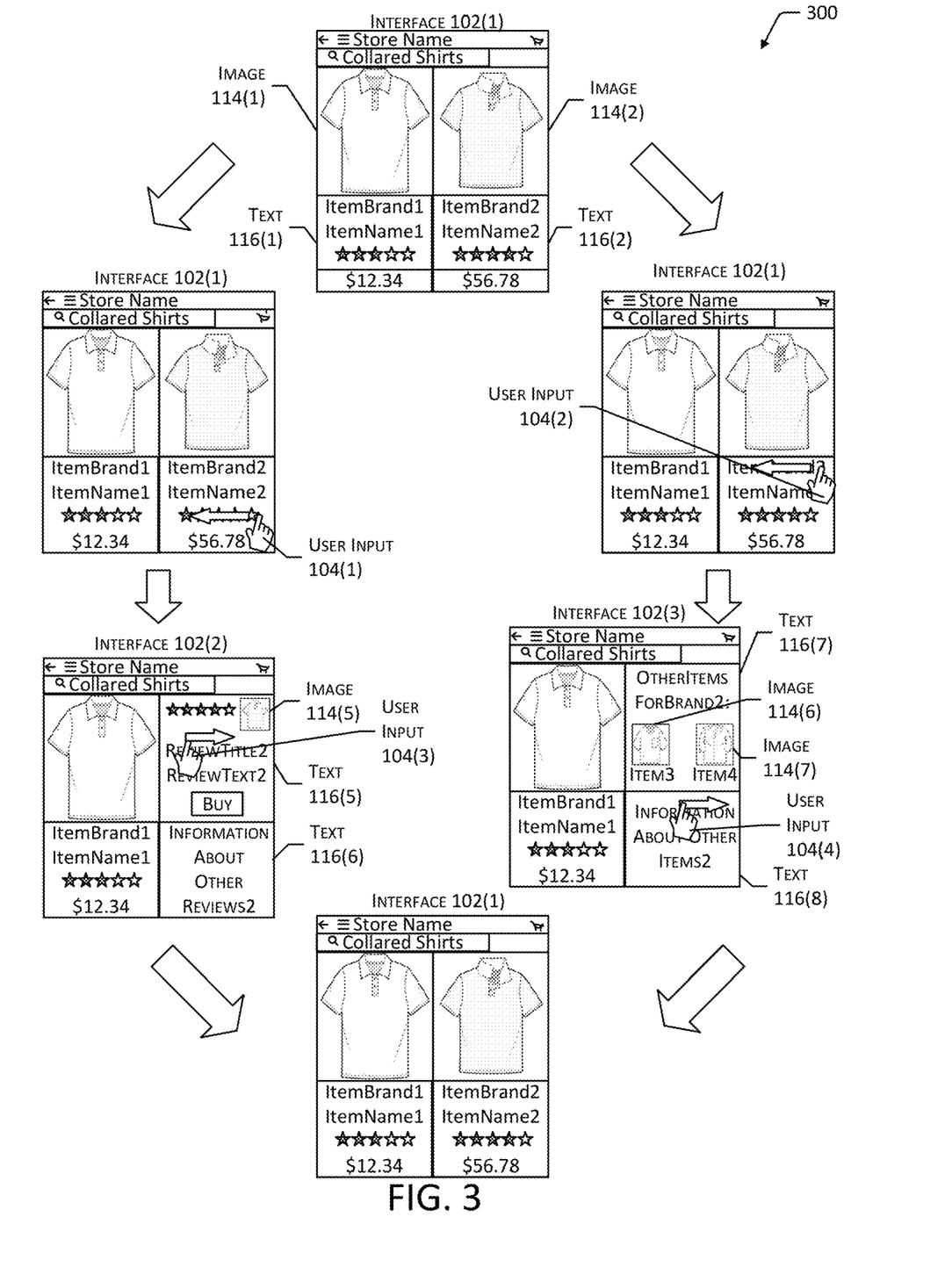
FIG. 3 is a diagram depicting an implementation of a transition from a first interface to a second interface or a third interface based on user input to particular regions of the first interface.

FIG. 3 is a diagram 300 depicting an implementation of a transition from a first interface 102(1) to a second interface 102(2) or a third interface 102(3) based on user input 104 to particular regions of the first interface 102(1). As described with regard to FIGS. 1 and 2, a first interface 102(1) may present data related to one or more items or other types of content. For example, FIG. 3 depicts the first interface 102(1) presenting a first image 114(1) and first text 116(1) associated with a first item in a first region of the first interface 102(1), and a second image 114(2) and second text 116(2) associated with a second item in a second region of the first interface 102(1). As described with regard to FIGS. 1 and 2, different types of user input 104, or user input 104 provided to different portions of the first interface 102(1), may cause additional information to be presented.

For example, FIG. 3 depicts first user input 104(1) provided to a portion of the second text 116(2) associated with user reviews for the second item. In response to the first user input 104(1), a second interface 102(2) may be presented that replaces the second image 114(2) and second text 116(2) with additional information associated with user reviews for the second item. For example, FIG. 3 depicts the second interface 102(2) presenting fifth text 116(5) and sixth text 116(6) associated with user reviews for the second item in the second region of the second interface 102(2), in a location where the second image 114(2) and second text 116(2) were presented in the first interface 102(1). The second interface 102(2) is also shown including a fifth image 114(5) indicative of the second item, which may indicate that the information presented in the fifth text 116(5) and sixth text 116(6) is associated with the second item depicted in the fifth image 114(5).

Alternatively, FIG. 3 depicts that second user input 104(2) may be provided to a different portion of the first interface 102(1). For example, FIG. 3 illustrates second user input 104(2) provided to a portion of the second text 116(2) associated with a brand or manufacturer or the second item. In response to the second user input 104(2), a third interface 102(3) may be presented that presents seventh text 116(7), eighth text 116(8), a sixth image 114(6), and a seventh image 114(7) indicative of other available items associated with the brand or manufacturer of the second item. The seventh text 116(7), eight text 116(8), sixth image 114(6), and seventh image 114(7) may be presented in a location where the second image 114(2) and second text 116(2) were presented in the first interface 102(1).

Therefore, as shown in FIG. 3, different types of user input 104 provided to different regions of the first interface 102(1) may cause different types of additional information to be presented in a subsequent interface 102. Additionally, as shown in FIG. 3, in response to third user input 104(3) of a particular type or to a particular portion of the second interface 102(2), presentation of the fifth image 114(5), fifth text 116(5), and sixth text 116(6) may be ceased, and presentation of the second image 114(2) and second text 116(2) may be resumed. Similarly, in response to fourth user input 104(4) of a particular type or to a particular portion of the third interface 102(3), presentation of the sixth image 114(6), seventh image 114(7), seventh text 116(7), and eighth text 116(8) may be ceased and presentation of the second image 114(2) and second text 116(2) may be resumed.

Figure 4:
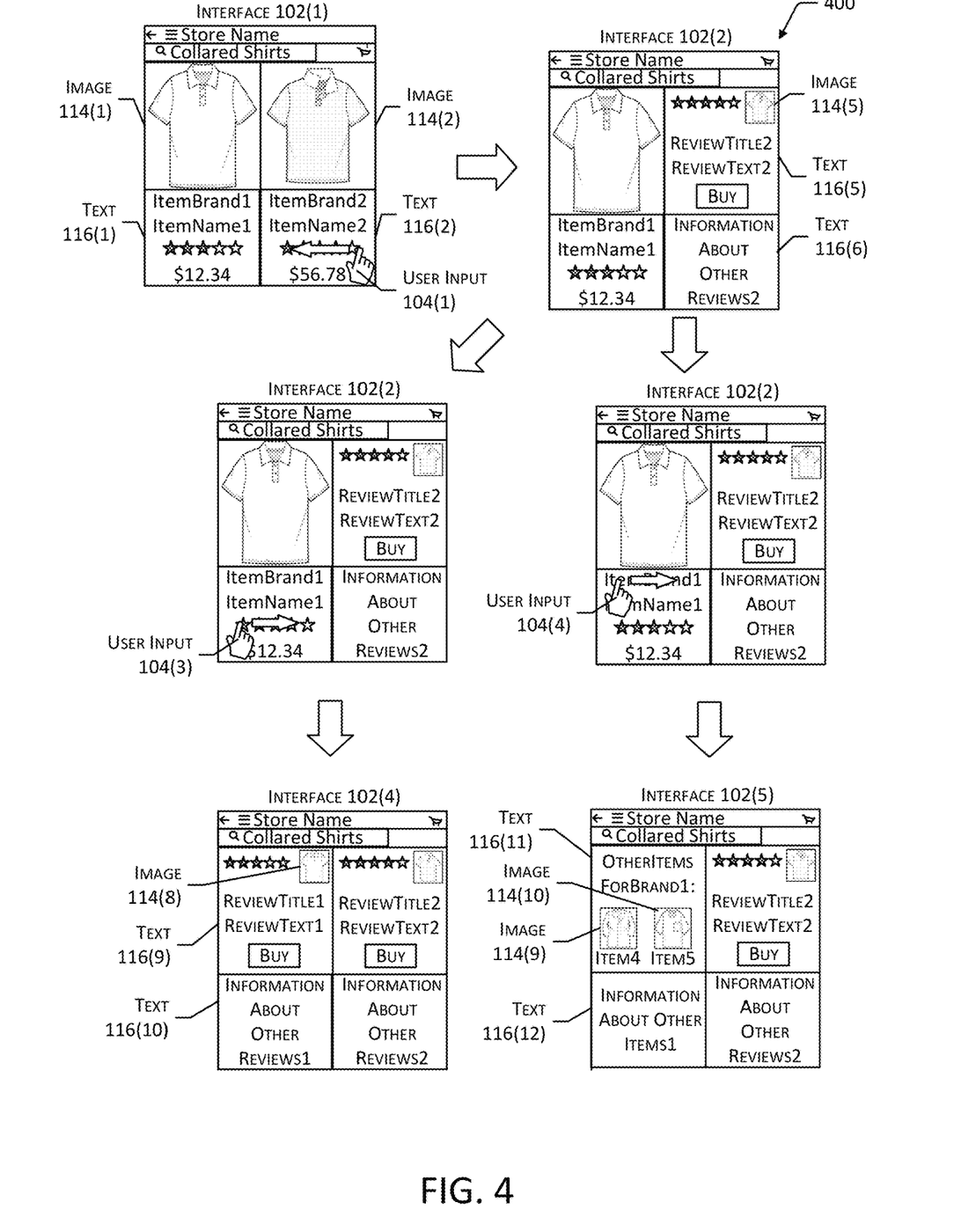
FIG. 4 is a diagram depicting an implementation of a transition from a first interface to other interfaces that present different combinations of information based on user input.

FIG. 4 is a diagram 400 depicting an implementation of a transition from a first interface 102(1) to other interfaces 102 that present different combinations of information based on user input 104. As described with regard to FIGS. 1-3, a first interface 102(1) may present information regarding a first item or other type of content in a first region and information regarding a second item or other type of content in a second region. For example, the first interface 102(1) is shown having a first image 114(1) and first text 116(1) associated with a first item in a first region, and a second image 114(2) and second text 116(2) associated with a second item in the second region. In response to user input 104(1) to a portion of an image 114 or text 116, other information may be presented. For example, FIG. 4 depicts first user input 104(1) provided to a portion of the second text 116(2) associated with user reviews for an item.

In response to the first user input 104(1), a second interface 102(2) may be presented. The second interface 102(2) is shown presenting a fifth image 114(5), fifth text 116(5), and sixth text 116(6) in the second region of the second interface 102(2). For example, the fifth text 116(5) and sixth text 116(6) may be associated with particular user reviews for the item associated with the second image 114(2) and second text 116(2). Continuing the example, the fifth text 116(5) may include at least a portion of the text associated with a selected user review for the second item, while the sixth text 116(6) may include information associated with the content of other reviews for the second item. The fifth image 114(5) may be identical to the second image 114(2) but have at least one dimension smaller than a corresponding dimension of the second image 114(2). In other implementations, the fifth image 114(5) may include an image of the second item that differs from the second image 114(2). In still other implementations, one or more other indications of the second item, such as an item name, may be included in the second interface 102(2) in place of or in addition to the fifth image 114(5).

While FIG. 4 depicts the second interface 102(2) presenting information associated with user reviews for the second item, as described with regard to FIG. 3, in response to other types of user input 104(2), other information may be presented. For example, user input 104(2) provided to a portion of the second text 116(2) associated with a brand or manufacturer of the second item may cause information indicative of other items associated with the brand or manufacturer of the second item to be presented.

Presentation of the fifth image 114(5), fifth text 116(5), and sixth text 116(6) in the second region of the second interface 102(2), in place of the second image 114(2) and second text 116(2), may allow a user to view the fifth image 114(5), fifth text 116(5), and sixth text 116(6) while other content within the first interface 102(1) remains accessible. For example, the second interface 102(2) is shown including the first image 114(1) and first text 116(1) in the first region of the second interface 102(2). Additional user input 104 may be provided to portions of the first image 114(1) or first text 116(1) in the second interface 102(2) to cause other information to be presented in the first region, while the fifth image 114(5), fifth text 116(5), and sixth text 116(6) remain visible in the second region.

For example, FIG. 4 depicts third user input 104(3) provided to a portion of the first text 116(1) associated with user reviews for the first item. In response to the third user input 104(3), a fourth interface 102(4) may be presented that includes additional information associated with user reviews for the first item. Specifically, FIG. 4 depicts the fourth interface 102(4) presenting an eighth image 114(8), ninth text 116(9), and tenth text 116(10) in the first region of the fourth interface 102(4). For example, the ninth text 116(9)

may include at least a portion of the text of a selected user review for the first item, while the tenth text 116(10) may include information regarding the content of one or more other user reviews. The eighth image 114(8) may be identical to the first image 114(1) but may have one or more dimensions smaller than corresponding dimensions of the first image 114(1). In other implementations, the eighth image 114(8) may include an image 114(8) of the first item that differs from the first image 114(1). In still other implementations, other information indicative of the first item, such as an item name, may be presented in the first region of the fourth interface 102(4) in addition to or in place of the eighth image 114(8).

By providing the first user input 104(1) to the portion of the second text 116(2) associated with user reviews for the second item and the third user input 104(3) to the portion of the first text 116(1) associated with user reviews for the first item, information regarding user reviews for multiple items may be viewed simultaneously, such as in adjacent regions of the fourth interface 102(4). While FIG. 4 depicts the first user input 104(1) to the second text 116(2) provided prior to the third user input 104(3) to the first text 116(1), in other implementations, user input 104(3) may be provided to the first text 116(1) prior to providing user input 104(1) to the second text 116(2).

In other cases, different regions of an interface 102 may present different types of information. For example, FIG. 4 depicts fourth user input 104(4) provided to a portion of the first text 116(1) associated with a brand of the first item. In response to the fourth user input 104(4), a fifth interface 102(5) may be presented that includes a ninth image 114(9) and tenth image 114(10) depicting other items associated with the brand of the first item, and eleventh text 116(11) and twelfth text 116(12) related to the other items. The ninth image 114(9), tenth image 114(10), eleventh text 116(11), and twelfth text 116(12) may be presented in the first region of the fifth interface 102(5) in place of the first image 114(1) and first text 116(1). As a result, information regarding available items associated with the brand of the first item may be presented simultaneously with information regarding user reviews associated with the second item.

While FIG. 4 depicts information regarding available items associated with a brand or manufacturer in the first region of the fifth interface 102(5) and information regarding user reviews in a second region, any type of information may be presented in any region of the fifth interface 102(5). Additionally, while FIG. 4 depicts the first user input 104(1) provided to the second text 116(2) prior to the fourth user input 104(4) being provided to the first text 116(1), in other implementations, user input 104(4) may be provided to the first text 116(1) prior to providing user input 104(1) to the second text 116(2).

Figure 5:
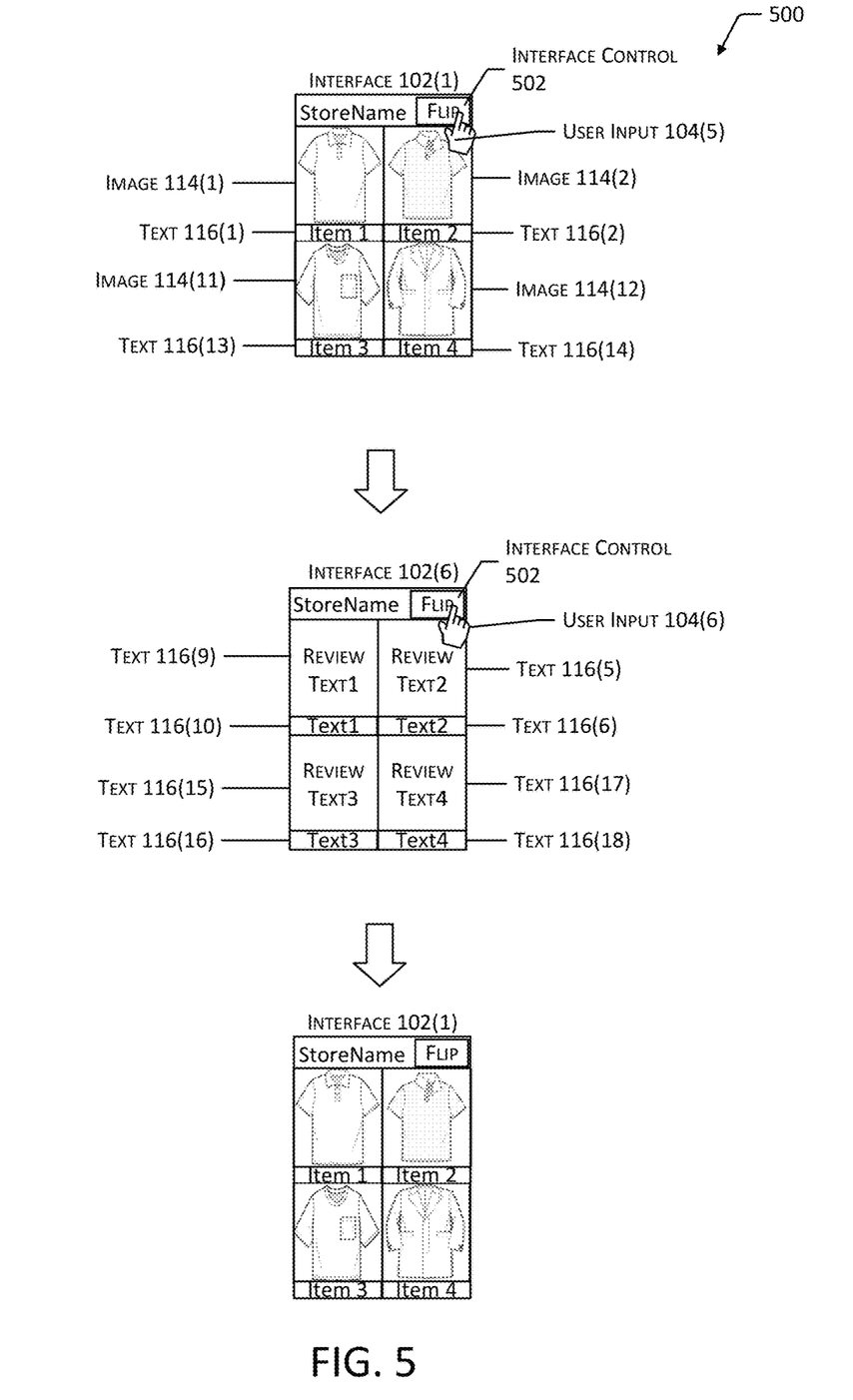
FIG. 5 is a diagram depicting an implementation of a transition from a first interface to a subsequent interface that presents different information in multiple regions.

FIG. 5 is a diagram 500 depicting an implementation of a transition from a first interface 102(1) to a subsequent interface 102(6) that presents different information in multiple regions. A first interface 102(1) is shown presenting a first image 114(1) and first text 116(1) in a first region, a second image 114(2) and second text 116(2) in a second region, an eleventh image 114(11) and thirteenth text 116(13) in a third region, and a twelfth image 114(12) and fourteenth text 116(14) in a fourth region. For example, each region of the first interface 102(1) may present at least one image 114 and at least one set of text 116 associated with an item or service available for purchase or lease.

FIG. 5 depicts the first interface 102(1) including an interface control 502 that may be used to cause different information to be presented in multiple regions by providing user input 104(5) to the interface control 502. For example, the first interface 102(1) may present information regarding similar items, such as items that are responsive to a search input 112 received from a user device 106. In such a case, a user may wish to view other information, such as review information for each of the items, for purposes of comparing the information.

In response to user input 104(5) to the interface control 502, a subsequent interface 102(6) may be presented in which review information, or another type of information, is presented in each region of the interface 102(6). For example, FIG. 5 depicts ninth text 116(9) and tenth text 116(10) presented in the first region of the interface 102(6), fifth text 116(5) and sixth text 116(6) in the second region, fifteenth text 116(15) and sixteenth text 116(16) in the third region, and seventeenth text 116(17) and eighteenth text 116(18) in the fourth region. By causing each region of the interface 102(6) to display alternate information for each item, a user may efficiently compare similar types of information for multiple items. While FIG. 5 depicts the subsequent interface 102(6) presenting text 116 associated with user reviews for items, other types of information may be presented in response to user input 104(5) to the interface control 502. In some implementations, an interface 102 may present different interface controls 502, and different types of information may be presented based on the particular interface control 502 to which user input 104 is provided. In other implementations, a type of user input 104 provided to the interface control 502 may be used to determine the additional information that is presented. For example, a first type of information may be presented in response to a swipe gesture provided to the interface control 502, while a second type of information may be presented in response to a tap gesture provided to the interface control 502.

In some implementations, in response to additional user input 104(6) provided to the interface control 502 of the subsequent interface 102(6), the original information presented in the first interface 102(1) may be presented. For example, FIG. 5 depicts presentation of the images 114 and text 116 of the first interface 102(1) in response to user input 104(6) provided to the interface control 502 of the subsequent interface 102(6).

Figure 6:
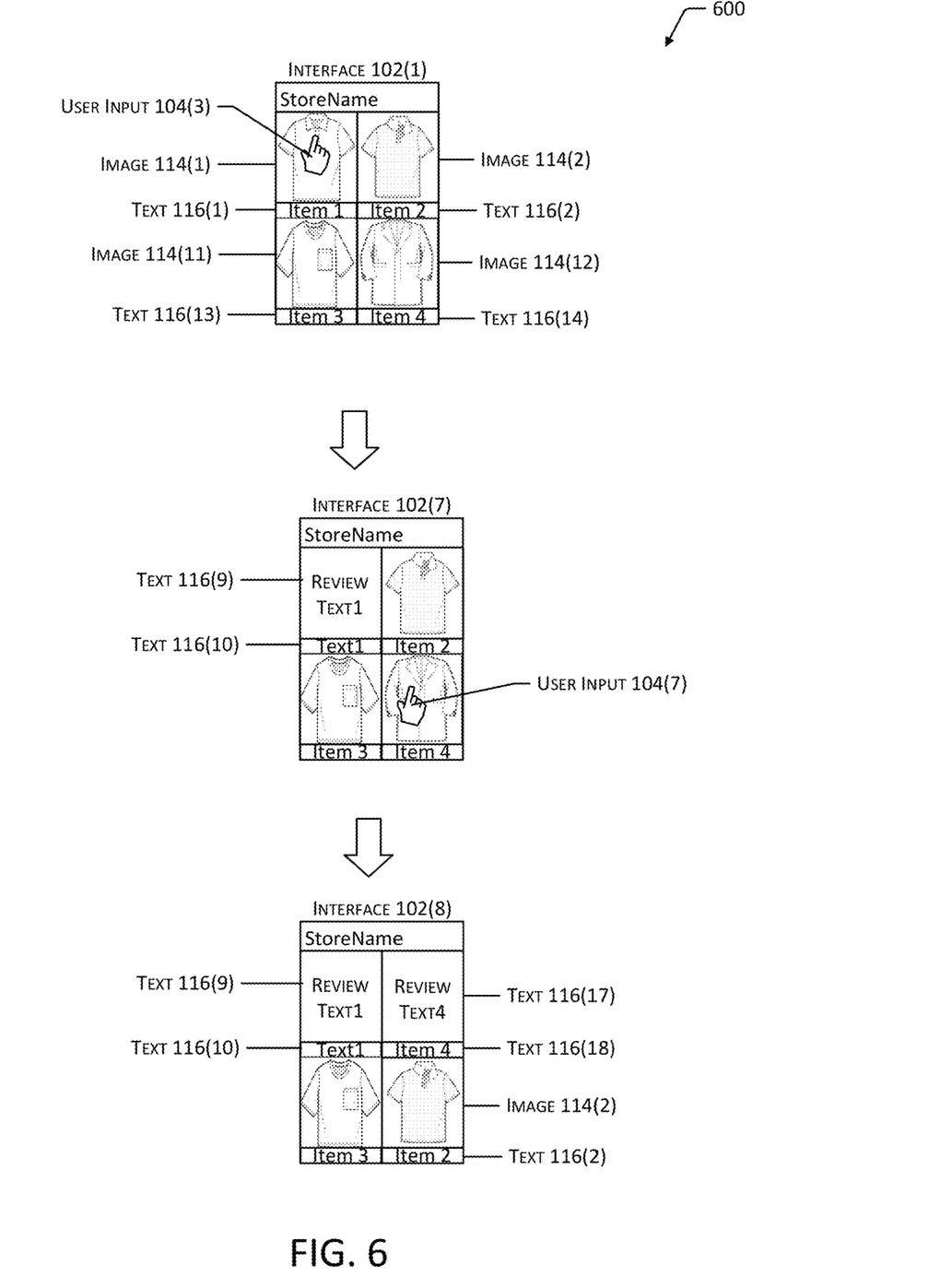
FIG. 6 is a diagram depicting an implementation of a transition from a first interface to a subsequent interface in which the order or arrangement of the presented information is modified based on user input.

FIG. 6 is a diagram 600 depicting an implementation of a transition from a first interface 102(1) to a subsequent interface 102(8) in which the order or arrangement of the presented information is modified based on user input 104(7). FIG. 6 depicts a first interface 102(1) presenting a first image 114(1) and first text 116(1) in a first region, a second image 114(2) and second text 116(2) in a second region, an eleventh image 114(11) and thirteenth text 116(13) in a third region, and a twelfth image 114(12) and fourteenth text 116(14) in a fourth region. For example, each region of the first interface 102(1) may present information associated with an item or service available for purchase or lease.

In response to user input 104(3) provided to the first region of the first interface 102(1), a subsequent interface 102(7) may be presented that includes other information within the first region. For example, user input 104(3) provided to the first region may be used to access information relating to user reviews for the item represented by the first image 114(1) and first text 116(1). Continuing the example, FIG. 6 depicts the subsequent interface 102(7) presenting ninth text 116(9) and tenth text 116(10) in the first region in place of the first image 114(1) and first text 116(1) shown in the first interface 102(1).

While the ninth text 116(9) and tenth text 116(10) are presented in the first region of the subsequent interface 102(7), the other images 114 and text 116 shown in the first interface 102(1) remain visible and accessible to additional user input 104(7). For example, FIG. 6 depicts additional user input 104(7) provided to the fourth region of the subsequent interface 102(7).

In response to the additional user input 104(7), additional information associated with the fourth item may be determined. For example, an additional interface 102(8) that includes seventeenth text 116(17) and eighteenth text 116 (18) associated with the fourth item may be presented. In some implementations, information that is determined in response to user input 104 may be positioned adjacent to other information that has been previously determined in response to user input 104, such as to facilitate comparison of this information by a user. For example, FIG. 6 depicts the additional interface 102(8) presenting the seventeenth text 116(17) and eighteenth text 116(18) in the second region of the interface 102(8), adjacent to the first region that presents the ninth text 116(9) and tenth text 116(10). In some implementations, the image 114(2) and text 116(2) that were previously presented in the second region may be presented in the region where the user input 104(7) was provided. In other implementations, the seventeenth text 116(17) and eighteenth text 116(18) may be placed within the second region of the interface 102(8) and the information presented in each subsequent region may be presented in the following region of the interface 102(8). For example, information previously presented in the second region may be presented in the third region, information previously presented in the third region may be presented in the fourth region, and so forth.

Figure 7:
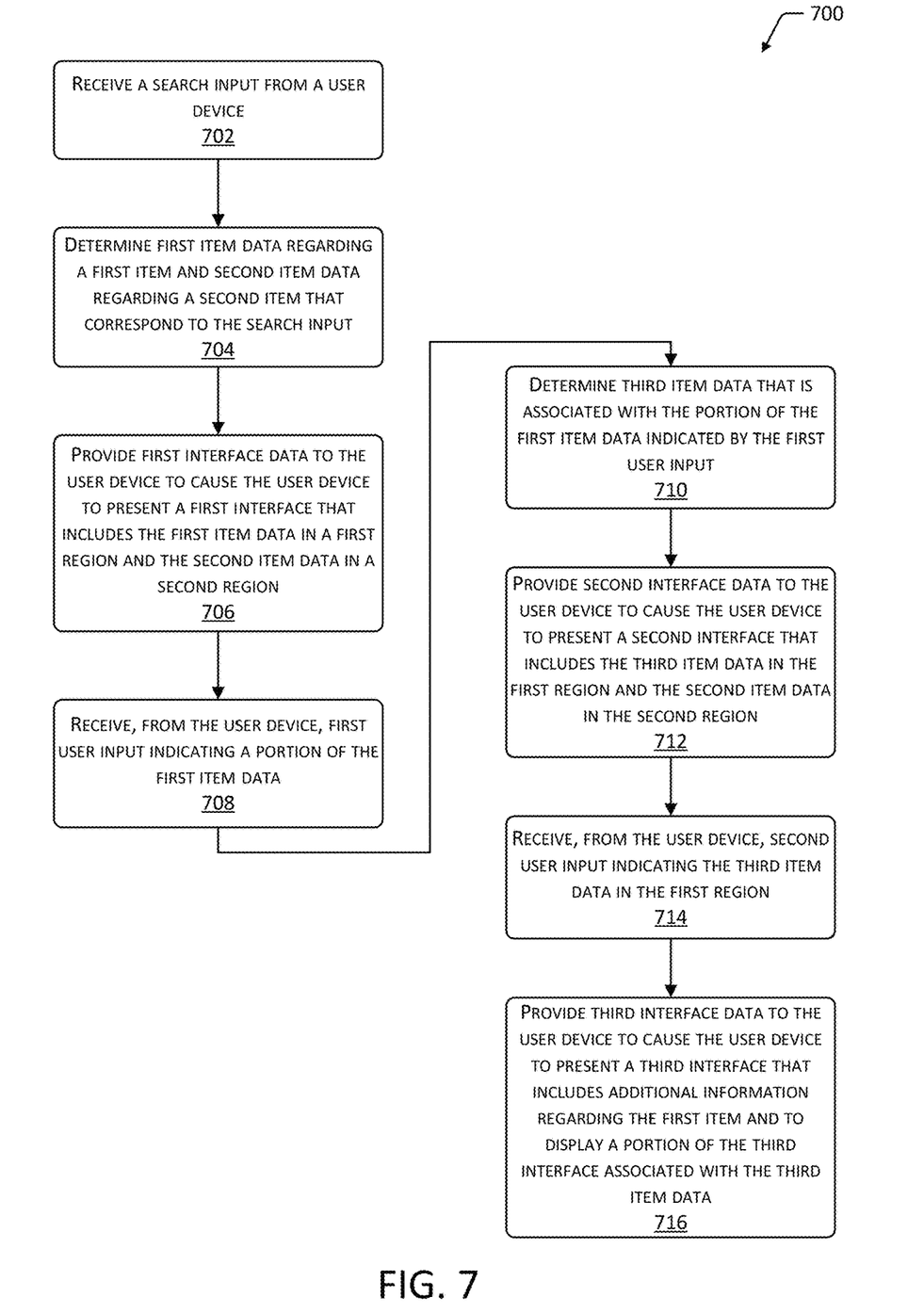
FIG. 7 is a flow diagram illustrating an implementation of a method for controlling the information presented in an interface based on user input to particular regions of the interface.

FIG. 7 is a flow diagram 700 illustrating an implementation of a method for controlling the information presented in an interface 102 based on user input 104 to particular regions of the interface 102. At 702, a search input 112 may be received from a user device 106. For example, the search input 112 may include text provided to a search interface or other type of field, a selection from a list or menu, and so forth. Continuing the example, a user may input text indicating characteristics of an item or service to purchase or rent, such as "collared shirts for men".

At 704, first item data regarding a first item and second item data regarding a second item that correspond to the search input 112 may be determined. Item data may include images 114 representing an item, text 116 describing the item or characteristics of the item, and so forth. For example, text 116 may indicate a name of an item, a brand or manufacturer of the item, a user review score or count of user reviews for the item, a price of the item, and so forth. While FIG. 7 describes determining first item data and second item data, any number of items may correspond to the search input 112, including zero items or a potentially large number of items. In some implementations, the number of items that are determined to correspond to the search input 112 may be limited to a threshold maximum number.

At 706, first interface data 108(1) may be provided to the user device 106 to cause the user device 106 to present a first interface 102(1) that includes the first item data in a first region and the second item data in a second region. For example, the first interface 102(1) may present a first image 114(1) and first text 116(1) associated with the first item in a bounded region, such as a rectangular area of the first interface 102(1). Similarly, a second image 114(2) and second text 116(2) associated with the second item may be presented in a separate region that may be adjacent to the first region. Other regions of the first interface 102(1) that present information regarding other items may also be visible depending on the size of the interface 102(1) or the size of the display area in which the interface 102(1) is presented. In some cases, other regions of the first interface 102(1) may be accessed by scrolling the interface 102(1) or through use of other navigational controls 202.

At 708, first user input 104(1) may be received from the user device 106. The first user input 104(1) may indicate a portion of the first item data. For example, the first user input 104(1) may include a touch, tap, or swipe gesture provided to a portion of the first image 114(1) or first text 116(1). As another example, the first user input 104(1) may include an indication of a portion of the first image 114(1) or first text 116(1) using a mouse device or other type of input device. As yet another example, the first user input 104(1) may include audio input indicating a portion of the first text 116(1). The user device 106 may provide data indicative of the first user input 104(1) to one or more servers 110 or other computing devices used to send interface data 108 to the user device 106. The particular portion of the item data indicated by the first user input 104(1), or the type of user input 104(1) that is received, may be used to determine subsequent information that is presented.

At 710, third item data that is associated with the portion of the first item data indicated by the first user input 104(1) may be determined. For example, if the first user input 104(1) indicates a portion of the first text 116(1) that presents a user review score or count of user reviews for a first item, the third item data may include the text of one or more user reviews or data indicative of the content of one or more user reviews for the first item. As another example, if the first user input 104(1) indicates a portion of the first text 116(1) that presents a brand or manufacturer of the first item, the third item data may include an indication of one or more other items associated with the brand or manufacturer of the first item.

At 712, second interface data 108(2) may be provided to the user device 106 to cause the user device 106 to present a second interface 102(2). The second interface 102(2) may include the third item data in the first region and the second item data in the second region. For example, the second image 114(2), second text 116(2), or other data indicative of the second item may remain visible and accessible in the second interface 102(2), while the third item data is presented in place of the first image 114(1), first text 116(1), or other data indicative of the first item. In some implementations, as described with regard to FIG. 4, additional user input 104 provided to the second region may cause other information to be presented in the second region in place of the second item data. Additionally, in some implementations, a particular type of additional user input 104 provided to the first region, or additional user input 104 provided to a particular portion of the first region, may cause the first item data from the first interface 102(1) to be displayed and presentation of the third item data to be ceased.

At 714, second user input 104(2) may be received from the user device 106. The second user input 104(2) may indicate a portion of the third item data in the first region. In some implementations, user input 104(2) to the first region may cause navigation to a separate interface 102 that presents additional information regarding the first item. In response to the user input 104(2) being provided to the third item data, the additional information that is presented may include a portion of the separate interface 102 that is related to the third item data. For example, if the third item data includes text 116 associated with user reviews for an item, the subsequent user input 104(2) may cause navigation to a separate interface 102 that includes additional information regarding the item, and the portion of the separate interface 102 associated with user reviews may be initially displayed.

At 716, third interface data 108 may be provided to the user device 106 to cause the user device 106 to present a third interface 102(3). The third interface 102(3) may include additional information regarding the first item. The portion of the third interface 102(3) that is initially displayed may be associated with the third item data to which the second user input 104(2) was provided.

Figure 8:
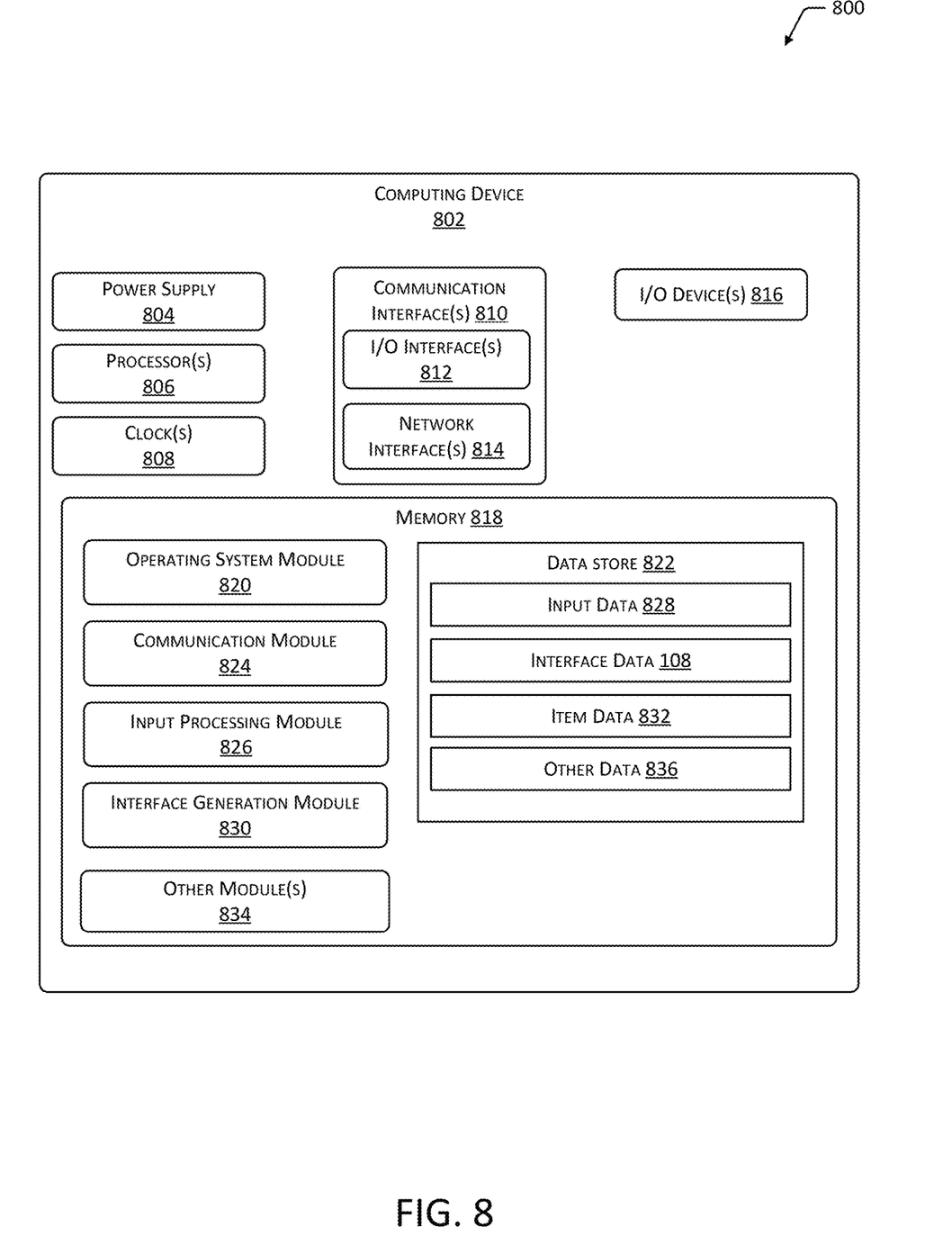
FIG. 8 is a block diagram illustrating an implementation of a computing device within the present disclosure.

FIG. 8 is a block diagram 800 illustrating an implementation of a computing device 802 within the present disclosure. The computing device 802 may include one or more servers 110, as shown in FIG. 1. In other implementations, the computing device 802 may include one or more user devices 106 or other devices in communication with a user device 106 or server 110. For example, different portions of the functions described herein may be performed by a user device 106 or by a server 110. Additionally, while FIG. 8 depicts a single block diagram 800 of a computing device 802, any number and any type of computing devices 802 may be used to perform the functions described herein.

One or more power supplies 804 may be configured to provide electrical power suitable for operating the components of the computing device 802. In some implementations, the power supply 804 may include a rechargeable battery, fuel cell, photovoltaic cell, power conditioning circuitry, and so forth.

The computing device 802 may include one or more hardware processor(s) 806 (processors) configured to execute one or more stored instructions. The processor(s) 806 may include one or more cores. One or more clock(s) 808 may provide information indicative of date, time, ticks, and so forth. For example, the processor(s) 806 may use data from the clock 808 to generate a timestamp, trigger a preprogrammed action, and so forth.

The computing device 802 may include one or more communication interfaces 810, such as input/output (I/O) interfaces 812, network interfaces 814, and so forth. The communication interfaces 810 may enable the computing device 802, or components of the computing device 802, to communicate with other computing devices 802 or components of the other computing devices 802. The I/O interfaces 812 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 812 may couple to one or more I/O devices 816. The I/O devices 816 may include any manner of input devices or output devices associated with the computing device 802. For example, I/O devices 816 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 816 may be physically incorporated with the computing device 802. In other implementations, the I/O devices 816 may be externally placed.

The network interfaces 814 may be configured to provide communications between the computing device 802 and other devices, such as the I/O devices 816, routers, access points, and so forth. The network interfaces 814 may include devices configured to couple to one or more networks including local area networks (LANs), wireless LANs (WLANs), wide area networks (WANs), wireless WANs, and so forth. For example, the network interfaces 814 may include devices compatible with Ethernet, Wi-Fi, Bluetooth, ZigBee, Z-Wave, 3G, 4G, 5G, LTE, and so forth.

The computing device 802 may include one or more busses or other internal communications hardware or software that allows for the transfer of data between the various modules and components of the computing device 802.

As shown in FIG. 8, the computing device 802 may include one or more memories 818. The memory 818 may include one or more computer-readable storage media (CRSM). The CRSM may be any one or more of an electronic storage medium, a magnetic storage medium, an optical storage medium, a quantum storage medium, a mechanical computer storage medium, and so forth. The memory 818 may provide storage of computer-readable instructions, data structures, program modules, and other data for the operation of the computing device 802. A few example modules are shown stored in the memory 818, although the same functionality may alternatively be implemented in hardware, firmware, or as a system on a chip (SoC).

The memory 818 may include one or more operating system (OS) modules 820. The OS module 820 may be configured to manage hardware resource devices such as the I/O interfaces 812, the network interfaces 814, the I/O devices 816, and to provide various services to applications or modules executing on the processors 806. The OS module 820 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 822 and one or more of the following modules may also be associated with the memory 818. The modules may be executed as foreground applications, background tasks, daemons, and so forth. The data store(s) 822 may use a flat file, database, linked list, tree, executable code, script, or other data structure to store information. In some implementations, the data store(s) 822 or a portion of the data store(s) 822 may be distributed across one or more other devices including other computing devices 802, network attached storage devices, and so forth.

A communication module 824 may be configured to establish communications with one or more other computing devices 802. Communications may be authenticated, encrypted, and so forth.

The memory 818 may also store an input processing module 826. The input processing module 826 may receive data indicative of user input 104, such as input to a particular region of an interface 102, navigational control 202, and so forth. The input processing module 826 may determine, based on interface data 108 indicative of the data presented in an interface 102 to which user input 104 was received, the particular content indicated by the user input 104. The input processing module 826 may determine one or more functions, commands, or data associated with the user input 104 and may cause the performance of one or more operations in response to the user input 104. For example, the input processing module 826 may access input data 828 that associates particular commands, functions, or additional data that may be accessed in response to particular types of user input 104. Continuing the example, the input processing module 826 may cause interface data 108 to be generated or retrieved and provided to a source of the user input 104 in response to user input 104 to a particular portion of an interface 102. As described with regard to FIGS. 1-7, in response to user input 104 to particular content presented in a first region of an interface 102, the input processing module 826 may determine additional content related to the particular content that received the user input 104. Additional interface data 108 may be provided to the source of the user input 104 to cause presentation of a subsequent interface 102 that includes the additional content.

The memory 818 may additionally store an interface generation module 830. The interface generation module 830 may determine interface data 108 based on received user input 104. For example, the interface generation module 830 may determine item data 832, such as images 114, text 116, or other types of data indicative of an item, that corresponds to user input 104 or a portion of an interface 102 to which user input 104 was received. The interface generation module 830 may determine content for inclusion in interface data 108, such as content associated a particular image 114 or text 116 to which user input 104 was received.

Other modules 834 may also be present in the memory 818. For example, other modules 834 may include permission or authorization modules to enable a user to provide authorization to send and receive data associated with the computing device 802. Other modules 834 may also include encryption modules to encrypt and decrypt communications between computing devices 802, authentication modules to authenticate communications sent or received by computing devices 802, a permission module to assign, determine, and manage user permissions to access or modify data associated with computing devices 802, and so forth. Other modules 834 may include modules for presenting interfaces 102 based on interface data 108, modifying presentation of interfaces 102 based on user configurations or preferences, and so forth.

Other data 836 within the data store(s) 822 may include configurations, settings, preferences, and default values associated with computing devices 802. Other data 836 may also include encryption keys and schema, access credentials, and so forth. Other data 836 may also include data that indicates associations between images 114, text 116, or other data presented in an interface 102. For example, such data may indicate related content that is to be presented if user input 104 is received that indicates particular content in an interface 102.

In different implementations, different computing devices 802 may have different capabilities or capacities. For example, servers 110 may have greater processing capabilities or data storage capacity than user devices 106.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more memories storing computer-executable instructions; and
   one or more hardware processors to execute the computer-executable instructions to:
   receive a search input from a user device;
   determine first item data associated with a first item that corresponds to the search input, wherein the first item data includes a first image of the first item and first text indicative of the first item;
   determine second item data associated with a second item that corresponds to the search input, wherein the second item data includes a second image of the second item and second text indicative of the second item;
   provide first interface data to the user device, wherein the first interface data is associated with a first interface that presents the first image and the first text in a first region and presents the second image and the second text in a second region;
   receive, from the user device, first user input indicating a portion of the first text, wherein the portion of the first text is associated with a first characteristic of the first item;
   in response to the first user input that indicates the portion of the first text, determine third text associated with the first characteristic of the first item;

provide second interface data to the user device, wherein the second interface data is associated with a second interface that presents the third text in the first region and presents the second image and the second text in the second region;

receive, from the user device, second user input indicating a portion of the second text, wherein the portion of the second text is associated with a second characteristic that differs from the first characteristic;

in response to the second user input that indicates the portion of the second text, determine fourth text associated with the second characteristic of the second item; and provide third interface data to the user device, wherein the third interface data is associated with a third interface, and wherein the third interface presents the third text in the first region and presents the fourth text in one or more of the second region or a third region concurrently with presentation of the third text.

2. The system of claim 1, further comprising computer-executable instructions to:

determine a third image of the first item, wherein the third image has at least one first dimension that is smaller than at least one second dimension of the first image; and include the third image in the second interface data, wherein the second interface presents the third image in the first region.

3. The system of claim 1, wherein the first region is non-adjacent to the second region and the third region is adjacent to the first region, the system further comprising computer-executable instructions to:

in response to the first user input to the first region and the second user input to the second region, generate the third interface data to cause the third interface to present the fourth text in the third region adjacent to the third text in the first region.

4. A method comprising:

determining first interface data associated with a first interface that presents first item data in a first region and second item data in a second region, wherein the second region is non-adjacent to the first region;

determining first user input associated with a first portion of the first item data, wherein the first portion is indicative of a first characteristic associated with the first item data;

in response to the first user input, determining third item data associated with the first portion of the first item data, wherein the third item data is further associated with the first characteristic;

determining second interface data associated with a second interface that presents the third item data in the first region, presents the second item data in the second region, and excludes presentation of at least a portion of the first item data;

determining second user input associated with a second portion of the second item data in the second region of the second interface;

in response to the second user input, determining fourth item data associated with the second portion of the second item data; and determining third interface data associated with a third interface, wherein in response to the first user input and the second user input, the third interface presents the third item data in the first region and presents the fourth item data in a third region that is adjacent to the first region, wherein the fourth item data is presented concurrently with the third item data.

5. The method of claim 4, further comprising:

determining that the first user input includes a first type of input, wherein the third item data is determined in response to the first type of input.

6. The method of claim 4, further comprising:

determining that the first portion of the first item data includes a first type of information, wherein the third item data includes the first type of information and is determined in response to the first portion including the first type of information.

7. The method of claim 4, further comprising:

including in the second interface data an indication of one or more of the first portion of the first item data or a third portion of the first item data to cause presentation of the indication in the first region of the second interface.

8. The method of claim 4, wherein: the first interface includes a first navigational link to a first portion of a fourth interface; the first portion of the fourth interface is associated with the first item data; the second interface includes a second navigational link to a second portion of the fourth interface; and the second portion of the fourth interface is associated with the third item data.

9. The method of claim 4, wherein:

the second portion of the second item data is indicative of a second characteristic associated with the second item data;

the second characteristic corresponds to the first characteristic; and the fourth item data is presented in the third region adjacent to the first region in response to the second characteristic corresponding to the first characteristic.

10. The method of claim 4, wherein the third item data includes a first type of information and the fourth item data includes a second type of information that differs from the first type of information.

11. A system comprising:

one or more memories storing computer-executable instructions; and one or more hardware processors to execute the computer-executable instructions to:

determine first interface data associated with a first interface that presents first data in a first region and second data in a second region;

determine first user input associated with a first portion of the first data, wherein the first portion of the first data is associated with a first type of information;

determine third data in response to the first user input, wherein the third data is associated with a second type of information that corresponds to the first type of information;

determine second interface data associated with a second interface that presents the third data in the first region and the second data in the second region;

determine second user input associated with a second portion of the second interface data, wherein the second portion of the second interface data is associated with a third type of information;

determine fourth data in response to the second user input, wherein the fourth data is associated with a fourth type of information that corresponds to the third type of information; and determine third interface data associated with a third interface that presents the third data in the first region and the fourth data in one or more of the second region or a third region concurrently with presentation of the third data.

12. The system of claim 11, wherein the first interface includes a control for requesting presentation of additional data, and wherein the first user input is associated with the control, the system further comprising computer-executable instructions to:
determine fifth data in response to the first user input, wherein the second interface presents the fifth data in the second region.

13. The system of claim 11, wherein:
the third type of information differs from the first type of information; and
the fourth type of information that corresponds to the third type of information differs from the second type of information.

14. The system of claim 11, wherein:
the first region and the second region are non-adjacent;
the third region is adjacent to the first region;
the fourth type of information corresponds to the second type of information; and
the third interface presents the fourth data in the third region in response to the fourth type of information corresponding to the second type of information.

15. The system of claim 11, further comprising computer-executable instructions to:
determine third user input changing a size of the third interface;
in response to the third user input, determine fifth data associated with the fourth data; and
determine fourth interface data associated with a fourth interface that presents the third data and the fourth data in the first region.

16. The system of claim 11, wherein the third interface includes a control for requesting presentation of the first data, the system further comprising computer-executable instructions to:
determine third user input associated with the control; and
in response to the third user input, cause presentation of the first data in the first region.

17. The system of claim 11, wherein the first user input is determined at a first time and the second data is associated with a first item, the system further comprising computer-executable instructions to:
at a second time after the first time, determine third user input associated with a navigational link of the second region; and
determine fourth interface data associated with a fourth interface that presents the second data and fifth data associated with the first item.

18. The system of claim 11, wherein the first data is received at a first time and the first data and the second data are associated with a first item, the system further comprising computer-executable instructions to:
at a second time after the first time, determine third user input associated with a first navigational link of the first region;
determine fourth interface data associated with a fourth interface that presents the first data and the second data;
determine a first portion of the fourth interface that is associated with the second data; and
cause presentation of the first portion of the fourth interface.

19. The system of claim 18, wherein the first region of the first interface includes a second navigational link for navigation to a second portion of the fourth interface, wherein the second portion of the fourth interface is associated with the first data.

20. The system of claim 11, wherein:
the first region and the second region are non-adjacent;
the third region is adjacent to the first region; and
the third interface presents the fourth data in the third region in response to determination of the first user input to the first data and the second user input to the second data.

* * * * *